(12) United States Patent
Kojima

(10) Patent No.: US 7,224,501 B2
(45) Date of Patent: May 29, 2007

(54) LIGHT-EMITTING DEVICE AND APPARATUS HAVING THE SAME

(75) Inventor: Nobuhisa Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/374,536

(22) Filed: Mar. 13, 2006

(65) Prior Publication Data

US 2006/0209417 A1 Sep. 21, 2006

(30) Foreign Application Priority Data

Mar. 16, 2005 (JP) ............................. 2005-075819

(51) Int. Cl.
*G02B 5/32* (2006.01)
*G03B 15/06* (2006.01)
*F21V 7/04* (2006.01)

(52) U.S. Cl. ...................... 359/16; 396/199; 362/602
(58) Field of Classification Search ................ 362/317, 362/602, 16, 155, 551; 359/16
See application file for complete search history.

(56) References Cited

U.S. PATENT DOCUMENTS

| RE35,877 E    | * | 8/1998  | Takagi ........................ 396/157 |
| 2002/0154511 A1 | * | 10/2002 | Verlage et al. .............. 362/487 |
| 2003/0117791 A1 | * | 6/2003  | Kim ............................ 362/31 |
| 2005/0024890 A1 | * | 2/2005  | Yamamoto et al. .......... 362/555 |
| 2005/0254107 A1 | * | 11/2005 | Amanai ....................... 359/16 |
| 2006/0039692 A1 | * | 2/2006  | Lee et al. ................... 396/198 |
| 2006/0093344 A1 | * | 5/2006  | Neel .......................... 396/176 |

FOREIGN PATENT DOCUMENTS

| JP | 2000-089318   |   | 3/2000 |
| JP | 2000089318 A  | * | 3/2000 |
| JP | 2001-255574   |   | 9/2001 |
| JP | 2001255574    | * | 9/2001 |

* cited by examiner

*Primary Examiner*—Jordan Schwartz
*Assistant Examiner*—James C. Jones
(74) *Attorney, Agent, or Firm*—Cowan, Liebowitz & Latman, P.C.

(57) ABSTRACT

A light-emitting device is disclosed which allows efficient irradiation of light from a plurality of light sources to achieve a predetermined light emission characteristic and has a small size. The light-emitting device has an optical member which includes a first reflecting surface which reflects light incident thereon from a first light source, a second reflecting surface which reflects light incident thereon from a second light source, and an emergence portion which causes the light from the first reflecting surface and the light form the second reflecting surface to emerge therefrom. The optical member reflects the light by the second reflecting surface and then transmits the light through the first reflecting surface to guide the light to the emergence portion.

7 Claims, 13 Drawing Sheets

LIGHT-EMITTING DEVICE AND APPARATUS HAVING THE SAME

BACKGROUND OF THE INVENTION

The present invention relates to a light-emitting device for use in various apparatuses such as image-taking apparatuses including a digital still camera and a video camera, and a camera-equipped cellular phone.

A typical illumination apparatus (light-emitting device) used in a camera is a flash unit which provides a large amount of illumination light by light emission in a flash discharge tube. In recent years, however, the large amount of illumination light, which has conventionally been used, is not necessarily required due to the increased sensitivity of an image-pickup device employing a CCD (charge-coupled device) sensor and a CMOS (complementary metal oxide semiconductor) sensor in an electronic camera. On the other hand, light-emitting diodes (hereinafter abbreviated as "LEDs") have been improved in luminance and widely used for various types of illumination.

Thus, an illumination apparatus for taking images by using the LED as a light source has been proposed recently (see Japanese Patent Laid-Open No. 2000-89318). The illumination apparatus has a plurality of white LEDs arranged such that their light-emitters are located to face substantially the same direction close to each other, and an optical member disposed in front of the LEDs and including a plurality of integrally molded lenses associated with the respective LEDs.

A recent trend of electronic cameras is to have a capability to take an image at an extremely close range, for example, at several centimeters from an image-taking lens.

If the conventional illumination apparatus is used under the situation, illumination light having adequate characteristics cannot be provided especially in taking images at an extremely close range (macro photography). Specifically, part of the illumination light is blocked by an image-taking lens barrel to prevent uniform illumination all over the necessary irradiation area, and the extremely short distance to an object causes overexposure of the object to result in a failure to realize favorable exposure.

To prevent those problems, the macro photography often employs an illumination apparatus for macro photography which includes a ring-shaped light source for mounting around the end of an image-taking lens barrel. However, such an illumination apparatus tends to be large and expensive.

In this manner, it has conventionally been difficult for a small illumination apparatus to perform illumination appropriate for both of ordinary image-taking and macro photography. In reality, it is necessary to provide such an illumination apparatus which is suitable for both of ordinary image-taking and close-range image-taking and is also realized in a small size and low cost.

For example, Japanese Patent Laid-Open No. 2001-255574 has proposed an illumination apparatus which has a ring portion for mounting around an image-taking lens barrel of a camera. The illumination apparatus directs light from a light source toward the circumference direction of the ring portion and causes the light reflected by a reflecting surface of the ring portion to emerge from an emergence surface opposite to the reflecting surface. This apparatus enables the light from the single light source to be irradiated in ring shape from around the image-taking lens barrel.

As described above, the luminance of the LED has been increased recently. However, as shown in Japanese Patent Laid-Open No. 2000-89318, a sufficient light amount for taking images is difficult to provide unless a plurality of LEDs are used.

The illumination apparatus proposed in Japanese Patent Laid-Open No. 2001-255574 directs the light from the single flash discharge tube (xenon tube) toward the ring portion disposed around the image-taking lens barrel. The apparatus cannot be used without any change when a plurality of LEDs are used as light sources. In other words, no proposal has been made conventionally of an illumination apparatus which allows efficient irradiation of light from a plurality of LEDs to realize an illumination (light distribution) characteristic suitable for macro photography and also has a small size.

BRIEF SUMMARY OF THE INVENTION

It is an object of the present invention to provide a light-emitting device which allows efficient irradiation of light from a plurality of light sources to achieve a predetermined light-emission characteristic (for example, a light distribution characteristic) and also has a small size.

According to an aspect, the present invention provides a light-emitting device including an optical member which includes a first reflecting surface which reflects light incident thereon from a first light source, a second reflecting surface which reflects light incident thereon from a second light source, and an emergence portion which causes the light from the first reflecting surface and the light form the second reflecting surface to emerge therefrom. The optical member reflects the light by the second reflecting surface and then transmits the light through the first reflecting surface to guide the light to the emergence portion.

According to another aspect, the present invention provides an apparatus on which the abovementioned light-emitting device is removably mounted or an apparatus which has the abovementioned light-emitting device integrally therewith.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
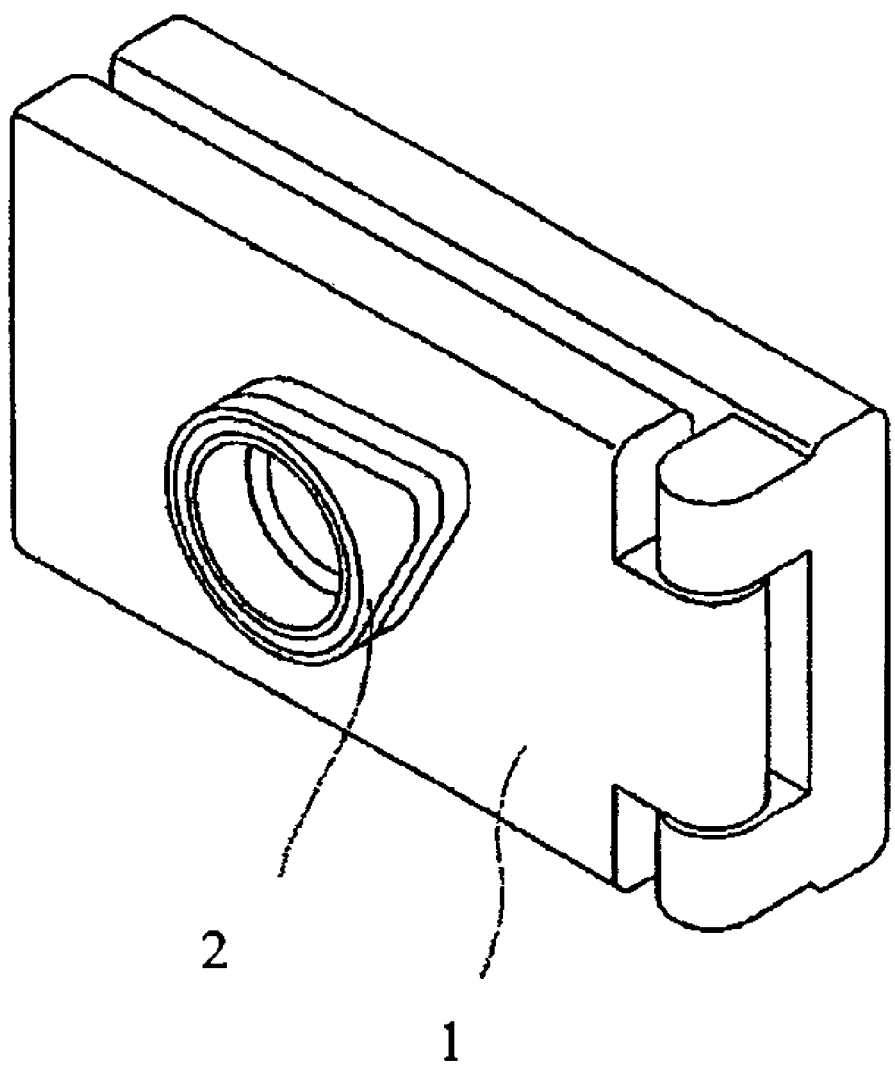
FIG. 1 is a perspective view showing a camera-equipped cellular phone on which a light-emitting device serving as Embodiment 1 of the present invention is mounted.
Figure 2:
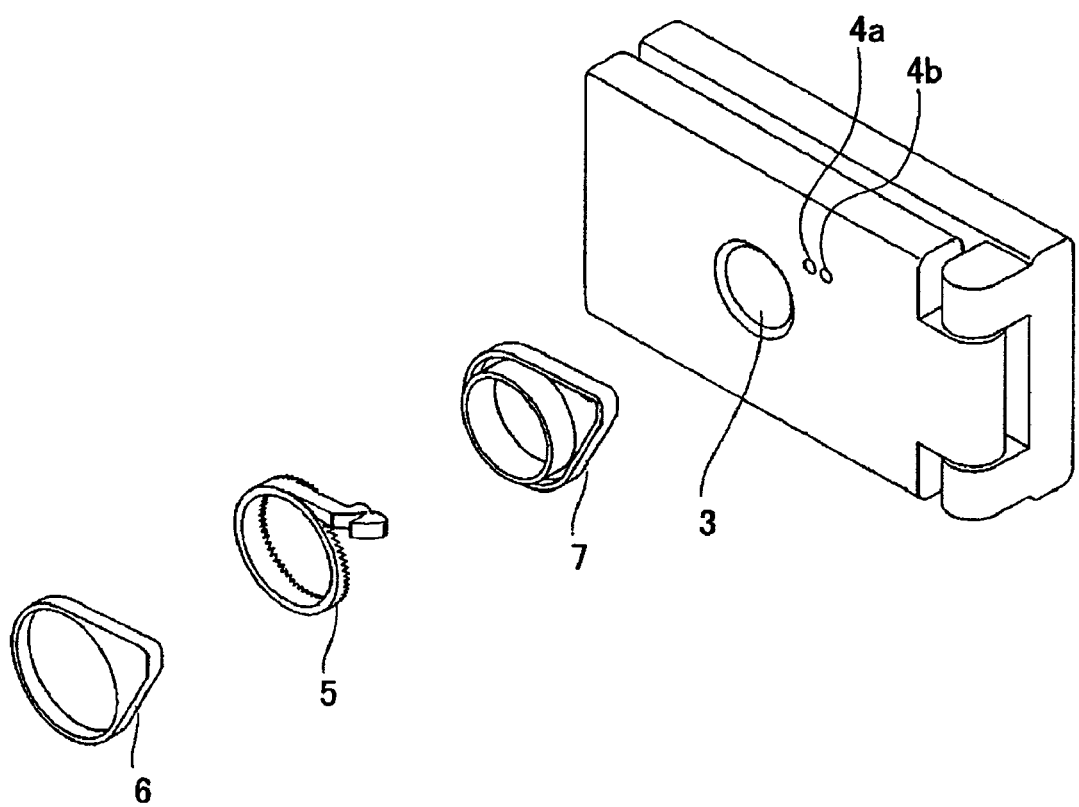
FIG. 2 is an exploded perspective view showing the light-emitting device of Embodiment 1.
Figure 3:
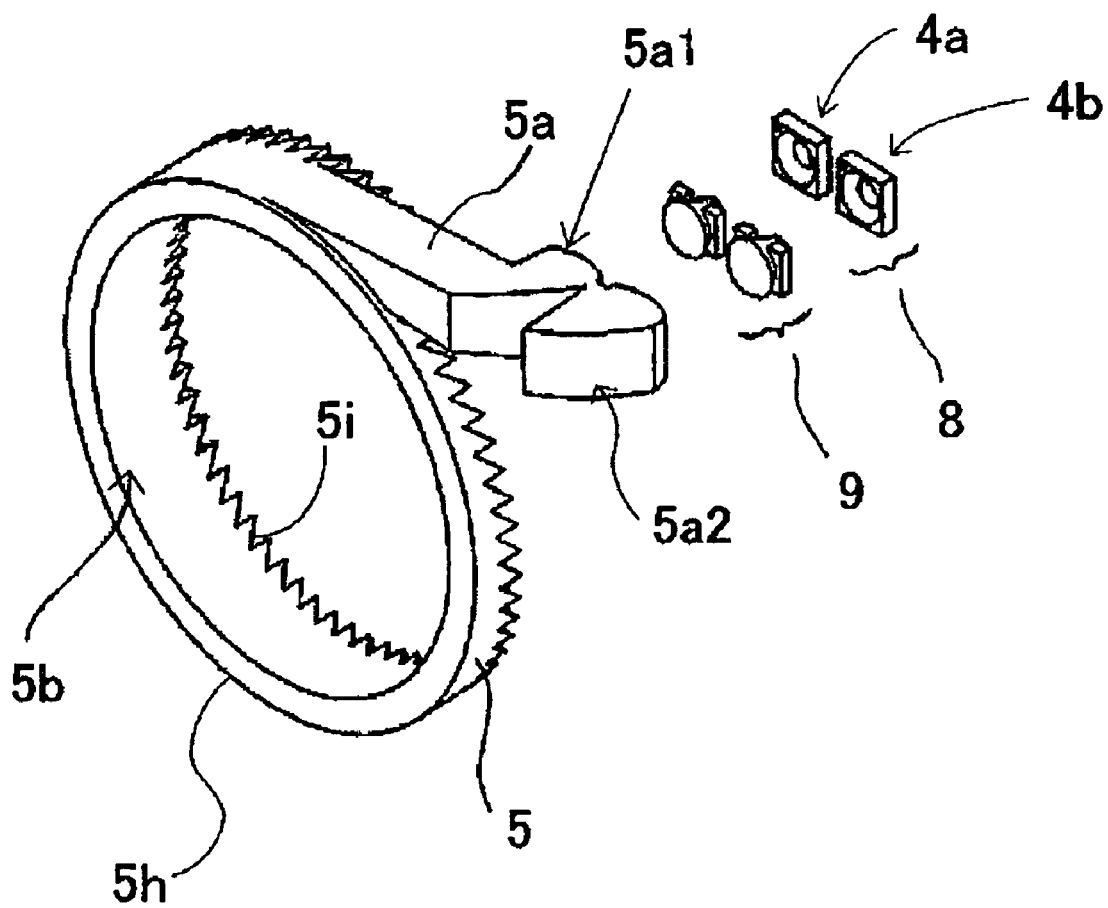
FIG. 3 is an exploded perspective view showing an optical system of the light-emitting device of Embodiment 1.

FIGS. 1 to 3 show a ring light for macro photography serving as a light-emitting device which is Embodiment 1 of the present invention. The ring light for macro photography of Embodiment 1 is mounted on a camera-equipped cellular phone as an example of an apparatus.

FIG. 1 is a perspective view of the camera-equipped cellular phone on which the ring light for macro photography is mounted. FIG. 2 is an exploded perspective view showing the ring light for macro photography. FIG. 3 is a perspective view showing the principal structure of an optical system of the ring light for macro photography.

In FIGS. 1 to 3, reference numeral 1 shows the camera-equipped cellular phone which has a communication function and a camera function. Reference numeral 2 shows the ring light for macro photography which is used to illuminate an object in taking an image at a close range (macro photography). The ring light 2 for macro photography is removably mounted on the camera-equipped cellular phone 1.

Reference numeral 3 shows a lens barrel which has an image-taking lens and forms an image of an arbitrary object on an image-pickup device (such as a CCD sensor and a CMOS sensor), not shown.

Reference numeral 4a and 4b show a first light emitter and a second light emitter serving as light sources which emit illumination light when object luminance is low or special image-taking is performed. In Embodiment 1, the two light emitter 4a and 4b are disposed close to each other at positions adjacent to the outside of the lens barrel 3.

As shown in FIG. 3, each of the first and second emitters 4a and 4b has an LED 8 which emits white light and a condenser lens 9 which condenses a luminous flux emitted from the LED 8. The LED 8 emits light in response to power supplied by an electric circuit, not shown. The condenser lens 9 changes the luminous flux emitted from the LED 8 to be directed in a predetermined irradiation range. The condenser lens 9 is made of a highly transparent resin material. The light emitters 4a and 4b each formed of the LED 8 and the condenser lens 9 are contained in the camera-equipped cellular phone 1.

Reference numeral 5 shows an optical member which forms part of the ring light 2 for macro photography. The optical member 5 has a light guiding portion 5a which directs light from the two light emitters 4a and 4b to an emergence portion 5b, later described, and the emergence portion in ring shape (hereinafter referred to as the ring portion) 5b which applies the luminous flux directed thereto by the light guiding portion 5a toward an object. The optical member 5 is made of a light-transmissive resin material as a single unit. The optical member 5 is disposed around the end of the lens barrel 3 such that the center of the ring portion 5b of the optical member 5 substantially matches the center of the optical axis of the lens barrel 3. Reference numeral 6 shows a front cover which houses the optical member 5, and 7 a rear cover which houses the optical member 5.

As shown in FIG. 3, the light guiding portion 5a of the optical member 5 has a first entrance portion 5a1 and a second entrance portion 5a2 for changing the directions of the luminous fluxes emitted and condensed by the first and second light emitters 4a and 4b, respectively, and gathering the respective luminous fluxes to predetermined narrow ranges.

The ring portion 5b has a ring emergence surface 5h for applying the luminous fluxes toward the object and light direction converting surfaces 5i formed on the side opposite to the ring emergence surface 5h.

The luminous fluxes enter the optical member 5 from the first entrance portion 5a1 and the second entrance portion 5a2, travel in the light guiding portion 5a, and are guided to the ring portion 5b. While they travel within the ring portion 5b, their directions are changed by the abovementioned light direction converting surfaces 5i or the like, until they are guided to the ring emergence surface 5h and emerge therefrom.

For example, when a user sets a camera mode and presses a release button in the camera-equipped cellular phone 1, a CPU (central processing unit), not shown, determines whether or not it instructs the light emitters 4a and 4b to emit light based on the brightness of external light measured by a photometric circuit, not shown, and the sensitivity of the image-pickup device. When the CPU determines that it instructs the light emitters to emit light, it outputs a light emission signal to cause the LEDs 8 to emit light. The luminous fluxes emitted from the LEDs 8 then enter the condenser lenses 9, are changed to have a predetermined light distribution characteristic by the condenser lenses 9, and then are applied toward an object.

The abovementioned camera-equipped cellular phone 1 is operable in a macro photography mode which allows image-taking at an extremely close range, for example, at a camera-to-object distance of several centimeters. In that macro photography mode, the ring light 2 for macro photography of Embodiment 1 is used. In this case, the luminous fluxes emitted from the LEDs 8 then enter the optical member 5 through the condenser lenses 9 and emerge from the ring emergence surface 5h of the ring portion 5b disposed around the image-taking lens 3.

With the ring light 2 for macro photography, each luminous flux from the LED 8, which can be considered as a point source of light, is irradiated from the ring emergence surface 5h. It is thus possible to take images at an extremely close range, for example at a camera-to-object distance of several centimeters.

Figure 4:
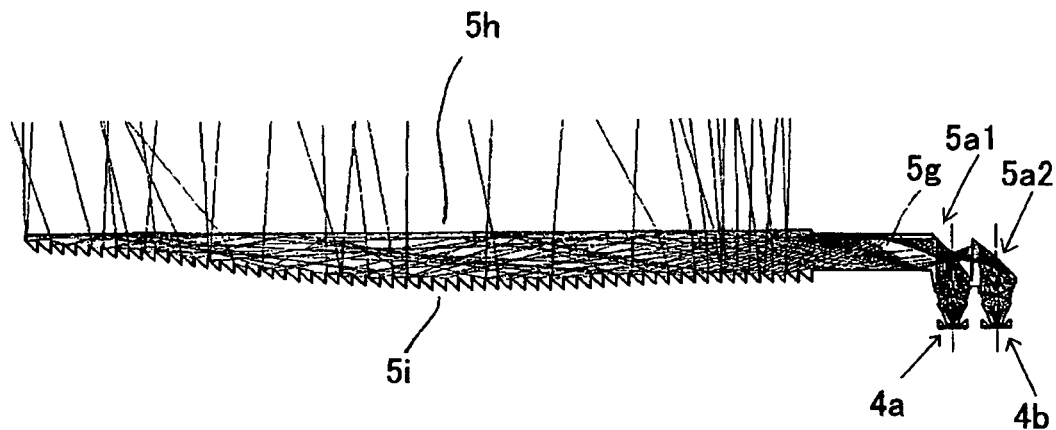
FIG. 4 is a developed sectional view showing the optical system of the light-emitting device of Embodiment 1.
Figure 5:
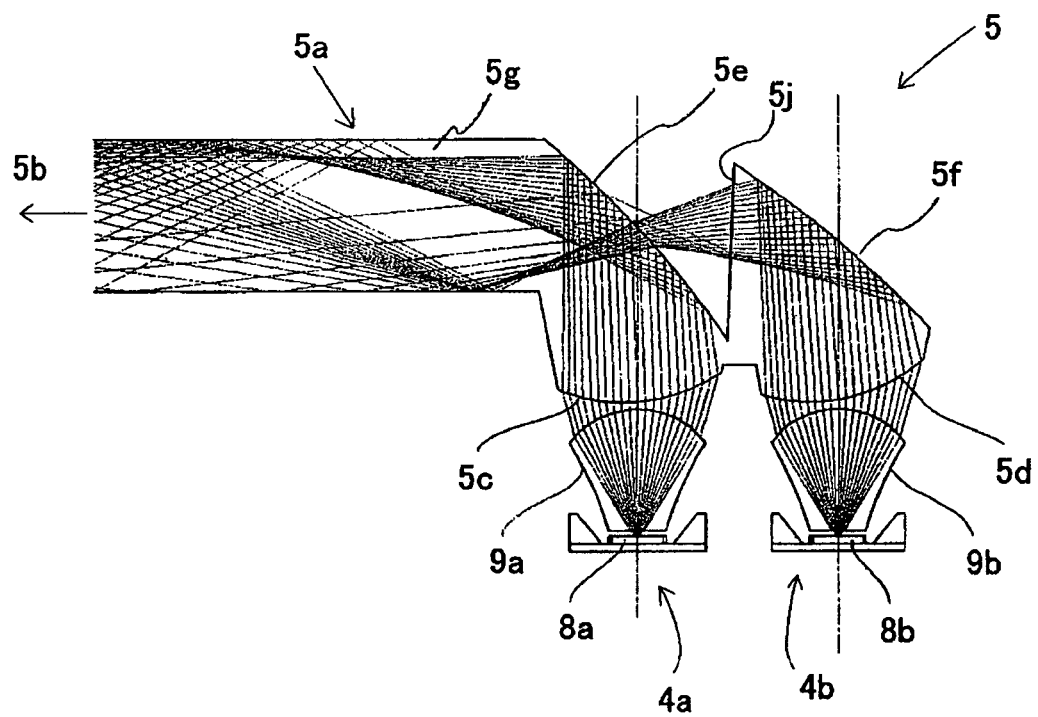
FIG. 5 is an enlarged sectional view showing entrance portions and the surroundings in the optical system of the light-emitting device of Embodiment 1.
Figure 6A:
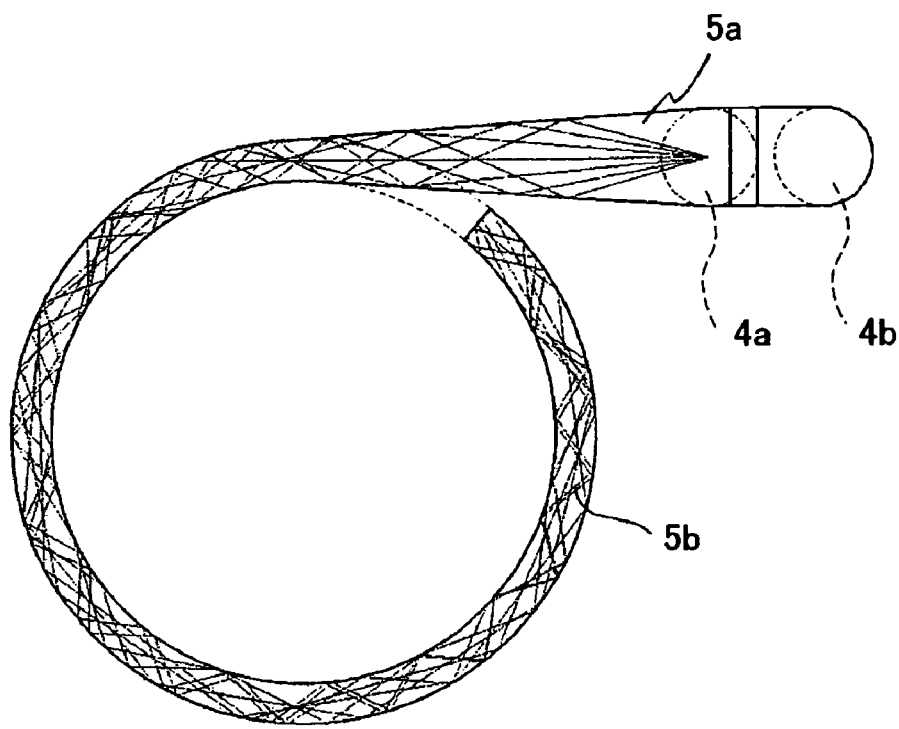
FIG. 6A is a longitudinal sectional view showing the optical system of the light-emitting device of Embodiment 1.
Figure 6B:
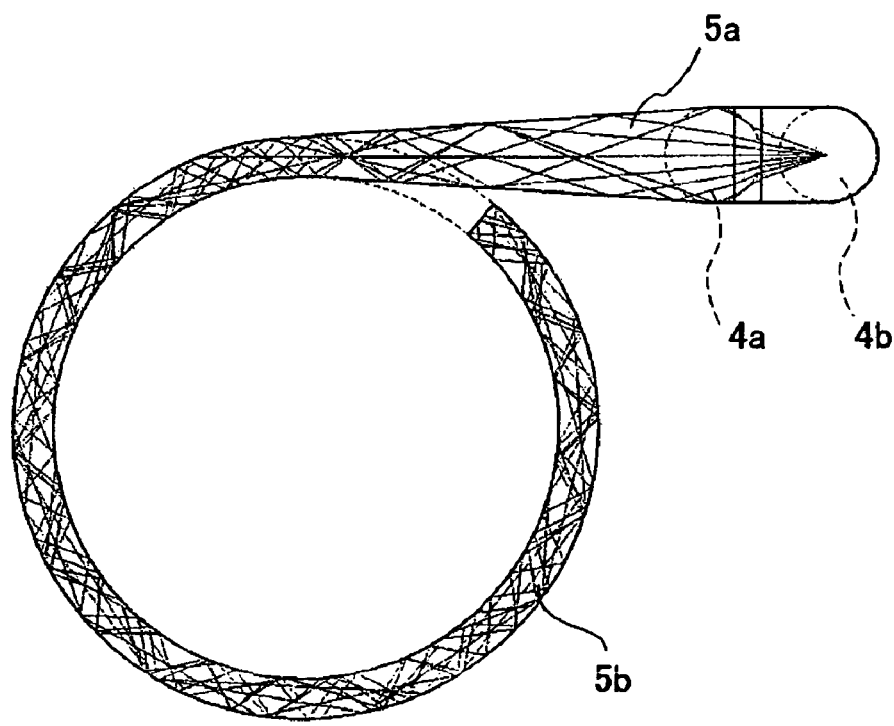
FIG. 6B is a longitudinal sectional view showing the optical system of the light-emitting device of Embodiment 1.

FIG. 4 shows the optical member 5 forming part of the ring light 2 for macro photography, developed in a circumferential direction, and also shows light ray tracing diagrams of luminous fluxes emitted from the first and second light emitters 4a and 4b. FIG. 5 is an enlarged view of the entrance portions of the optical member 5 and the surroundings, and also shows light ray tracing diagrams. FIG. 6A is a light ray tracing diagram of the luminous flux emitted from the first light emitter 4a in the optical member 5. FIG. 6B is a light ray tracing diagram of the luminous flux emitted from the second light emitter 4b in the optical member 5. FIGS. 6A and 6B show the luminous fluxes which are emitted from the light emitters, travel in the circumferential direction within the optical member 5 while they are totally reflected repeatedly, and then are stopped near the end thereof. However, they are actually not stopped and circulate in the optical member 5 until they emerge from the ring emergence surface 5h.

As shown in FIG. 5, the first entrance portion 5a1 has an entrance surface 5c having a positive optical power which is opposed to the first light emitter 4a and receives the luminous flux from the first light emitter 4a, and a total reflecting surface 5e having a positive optical power which substantially totally reflects the luminous flux transmitted through the entrance surface 5c. The second entrance portion 5a2 has an entrance surface 5d having a positive optical power which is opposed to the second light emitter 4b and receives the luminous flux from the second light emitter 4b, a total reflecting surface 5f having a positive optical power which substantially totally reflects the luminous flux transmitted through the entrance surface 5d, and an emergence surface 5j which sends the luminous flux totally reflected by the total reflecting surface 5f outside the optical member 5. Each of the total reflecting surfaces 5e and 5f is formed of a continuous aspheric surface. The first and second entrance portions 5a1 and 5a2 are connected to each other through their portions closer to the entrance surfaces. Reference numeral 5g shows a connection portion which links the first and second entrance portions 5a1 and 5a2 of the light guiding portion 5a to the ring portion 5b.

The luminous fluxes emitted from the LEDs 8a and 8b of the first and second light emitters 4a and 4b are then condensed by the condenser lenses 9a and 9b, respectively, to the predetermined irradiation angle range. The predetermined irradiation angle range corresponds to an irradiation angle range necessary for a typical camera-to-object distance (for example, 50 cm or longer) in the camera-equipped cellular phone. The irradiation angle range is adjusted by the shapes of the condenser lenses 9a and 9b and the distances between the LEDs 8a and 8b and the condenser lenses 9a and 9b. The luminous fluxes emerging from the condenser lenses 9a and 9b then enter the first and second entrance portions 5a1 and 5a2 from the entrance surfaces 5c and 5d, respectively. The entrance surfaces 5c and 5d are larger than the emergence surfaces of the condenser lenses 9a and 9b and thus can make the most of the light amounts emerging from the condenser lenses 9a and 9b, that is, the light amounts emitted from the LEDs 8a and 8b.

The luminous fluxes are condensed by the entrance surfaces 5c and 5d and the total reflecting surfaces 5e and 5f, while the directions thereof are changed by the total reflecting surfaces 5e and 5f. Specifically, the total reflecting surfaces 5e and 5f change the directions by approximately π/2 (rad) to allow efficient guidance of the luminous fluxes from the entrance surfaces 5c and 5d to the ring portion 5b.

The first and second entrance portions 5a1 and 5a2 perform the abovementioned direction changes by using the total reflecting surfaces, not by using a metal-evaporated surface with high reflectivity which is often used as a reflecting surface. The total reflection is a phenomenon in which a component of luminous flux traveling from a medium with a high refractive index to a medium with a low refractive index that has an angle larger than a critical angle at the boundary between them is reflected with a reflectivity of 100%. An optical system which frequently utilizes the total reflection can realize a direction change with extremely low loss.

The luminous fluxes in the directions changed by the total reflecting surfaces 5e and 5f in the first and second entrance portions 5a1 and 5a2 are guided to the connection portion 5g. The luminous flux reflected by the total reflecting surface 5f of the second entrance portion 5a2 once emerges outside optical member 5 from the emergence surface 5j, and again enters the optical member 5 from the total reflecting surface 5e of the first entrance portion 5a1. Since the total reflecting surface 5e is realized by the total reflection, not by a metal-evaporated surface, it allows the re-entrance of the luminous flux into the optical member 5 after it is reflected by the total reflecting surface 5f and emerges outside from the emergence surface 5j. The total reflecting surface 5f may be formed as a reflecting surface realized by a metal-evaporated surface.

The first entrance portion 5a1 is connected to the ring portion 5b through the connection portion 5g. The luminous flux entering the ring portion 5b through the connection portion 5g is then reflected a number of times within the ring portion 5b, and part of the luminous flux emerges from the ring emergence surface 5h. The shape of the connection portion 5g is set to minimize the luminous flux entering the ring portion 5b and then returning toward the entrance portions 5a1 and 5a2 through the connection portion 5g.

Next, description will be made of how the directions of the luminous fluxes are changed (or converted) in the ring portion 5b to the optical axis direction of the image-taking lens (toward the object). In Embodiment 1, to cause the luminous fluxes entering the ring portion 5b along the circumferential direction to be guided toward the object, a number of the direction converting surfaces 5i are formed on the surface of the ring portion 5b opposite to the emergence surface (ring emergence surface) 5h to reflect the luminous fluxes incident on the direction converting surfaces 5i toward the object.

The direction converting surfaces 5i are basically provided as a plurality of prism shapes (hereinafter referred to as prism portions) formed continuously each having a total reflecting surface and a re-entrance surface (edge surface). Of the light traveling in the ring portion 5b and then reaching the total reflecting surface of the prism portion, only the component at a predetermined angle is totally reflected by the total reflecting surface toward the ring emergence surface 5h. The light component not totally reflected by the total reflecting surface is refracted by the prism portion and once emerges outside the ring portion 5b, and is again guided into the ring portion 5b through the re-entrance surface of another prism portion present in the traveling direction.

In this manner, as shown in FIGS. 6A and 6B, the luminous flux directed to the ring portion 5b then circulates in the ring portion 5b while it is reflected a number of times within the ring portion 5b. During the circulation, the traveling direction of the luminous flux is changed by the direction converting surfaces 5i and it is guided to the ring emergence surface 5h, followed by emergence toward the object. The emerging light has generally uniform distribution of light amount over substantially the entire ring emergence surface 5h.

The connection portion 5g is connected to the ring portion 5b in the direction of a tangent thereto. Such a connection can efficiently guide the luminous flux to enter the ring portion 5b along the circumference of the ring portion 5b.

An extremely small diameter of the ring portion 5b is not preferable since the luminous flux in the ring portion 5b easily escapes outside. On the other hand, a diameter larger than necessary increases the size of the outer shape too much. For these reasons, the radius r (the radius from the center) of the ring portion 5b is preferably set in a range to satisfy the following relationship:

$$10 \text{ mm} \leq r \leq 100 \text{ mm} \tag{1}$$

where the lower limit 10 mm is set on the basis of the fact that a smaller value of the radius r cannot achieve efficient light guidance, and the upper limit 100 mm is set on the basis of the fact that a larger value of the radius r results in an illumination optical system disproportionately large for a camera-equipped cellular phone or a small image-taking apparatus.

Figure 7:
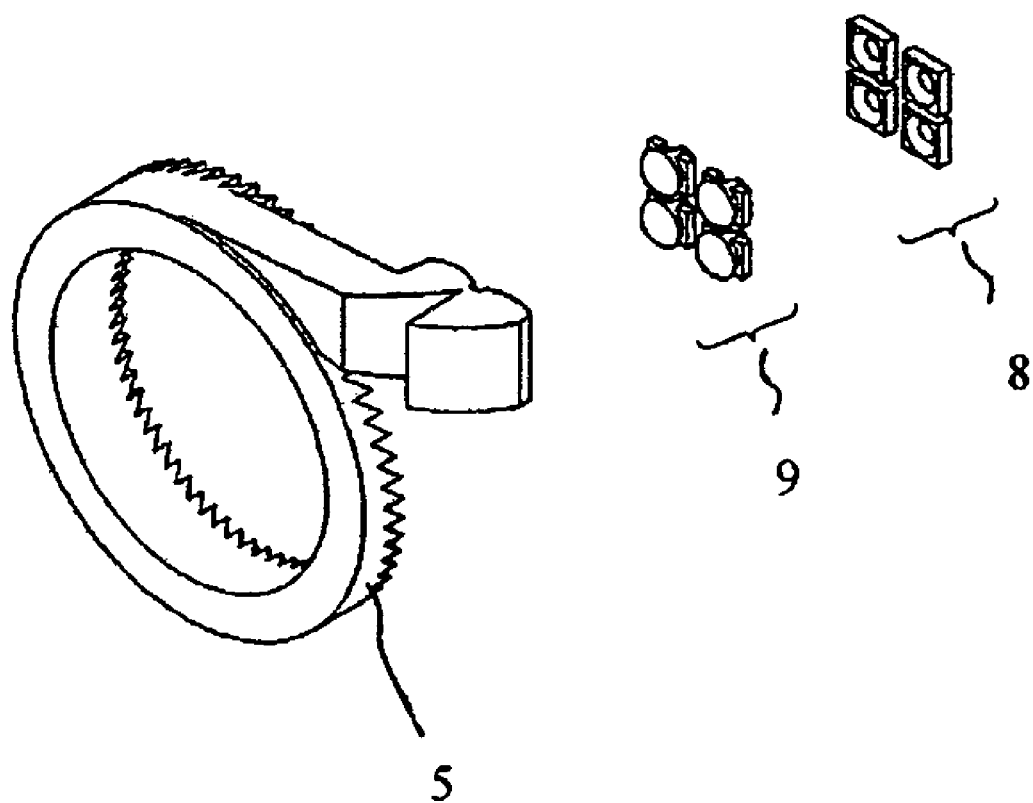
FIG. 7 is an exploded perspective view showing an optical system of a light-emitting device which is a modification of Embodiment 1.

FIG. 7 shows a modification of Embodiment 1. In the modification, luminous fluxes from two LEDs enter a single entrance surface of an optical member 5. The arrangement allows a larger amount of luminous flux to be guided to the ring portion, thereby realizing illumination with a higher luminance.

It is possible that luminous fluxes from three or more LEDs enter a single entrance portion.

While Embodiment 1 has been described in conjunction with the ring light for macro photography removably mounted on the image-taking apparatus, the ring light for macro photography may be provided integrally with (built in) the image-taking apparatus. This applies to Embodiments 2 to 5, later described.

Embodiment 2

Figure 8:
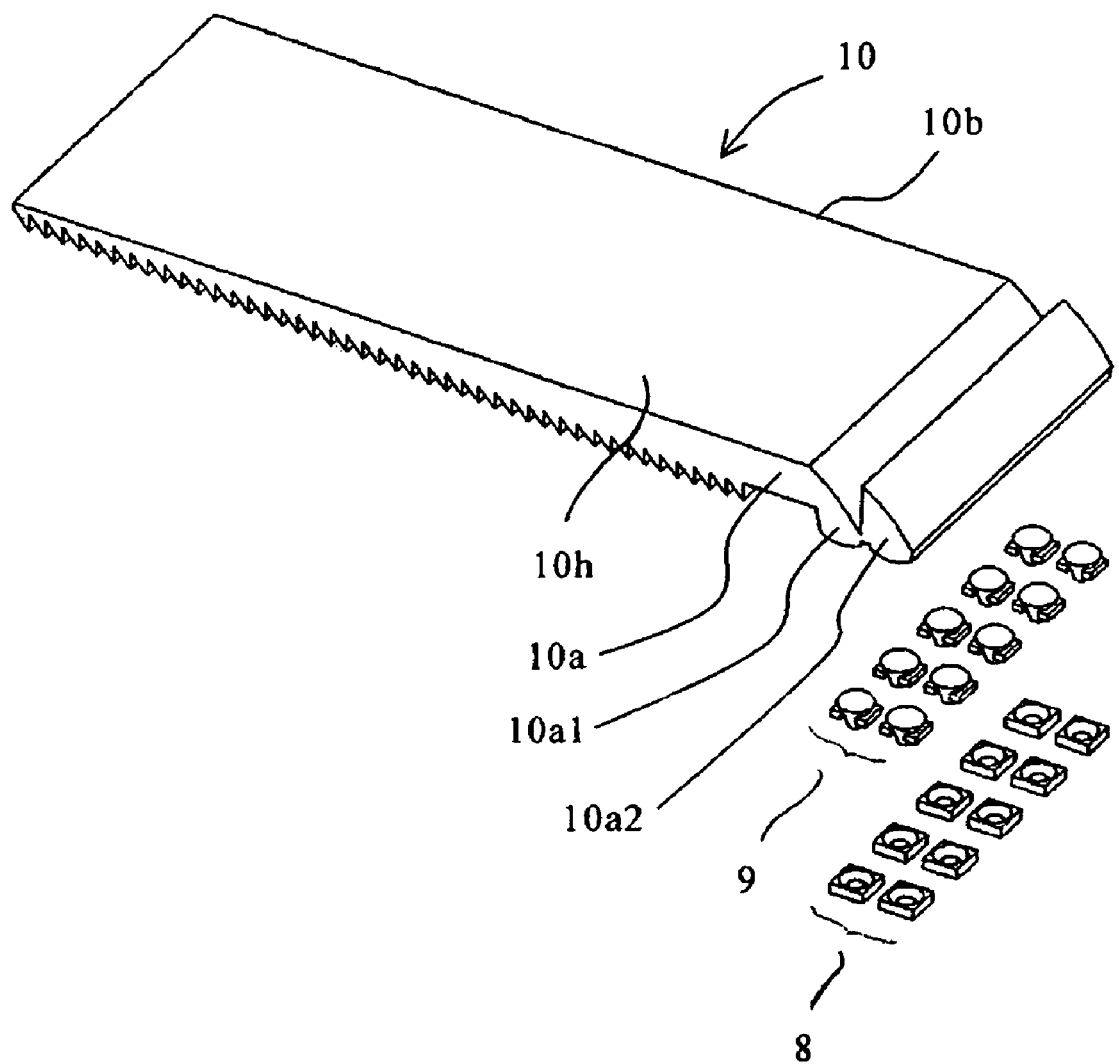
FIG. 8 is an exploded perspective view showing a light-emitting device which is Embodiment 2 of the present invention.
Figure 9:
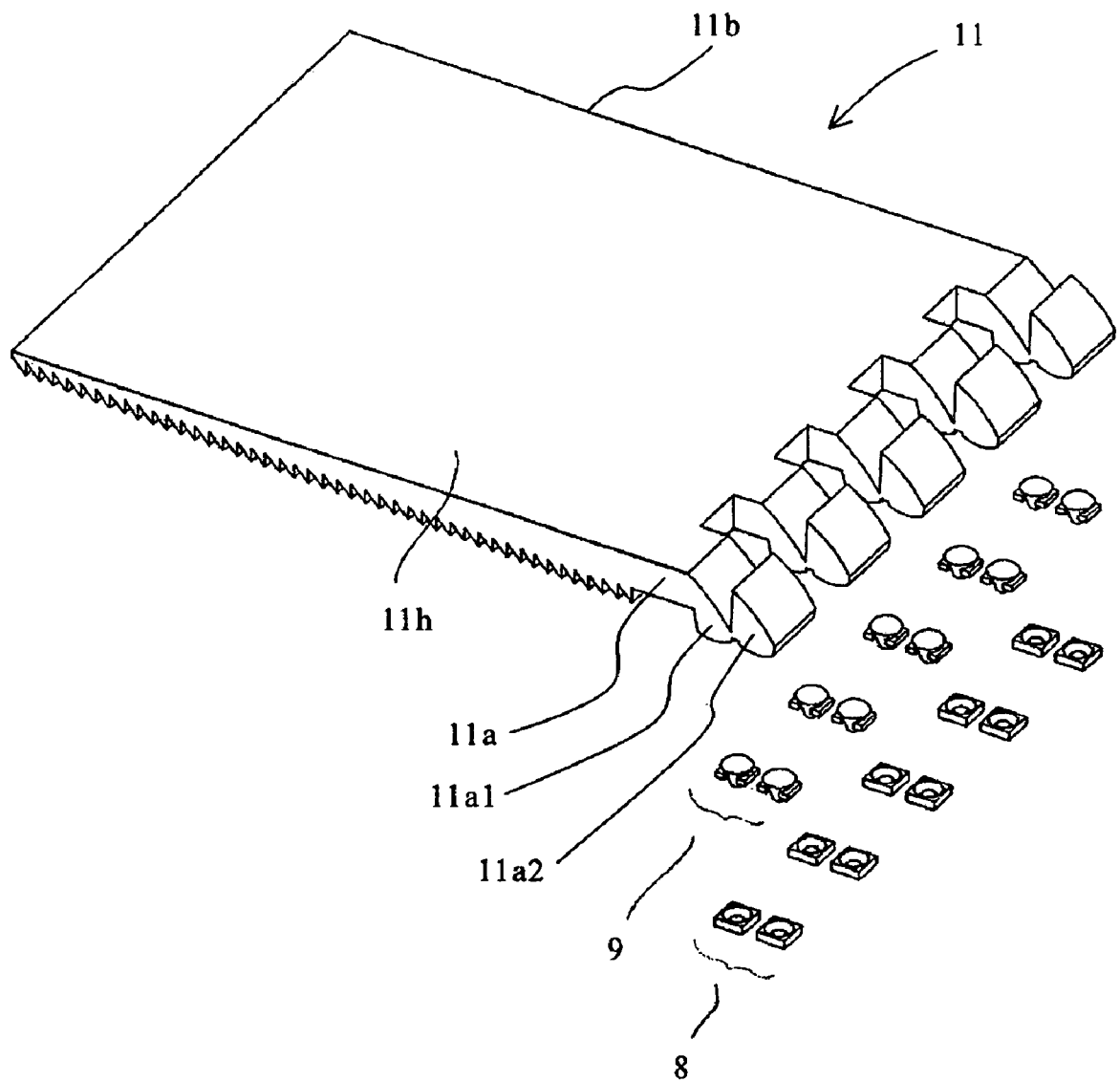
FIG. 9 is an exploded perspective view showing a light-emitting device which is a modification of Embodiment 2.
Figure 10:
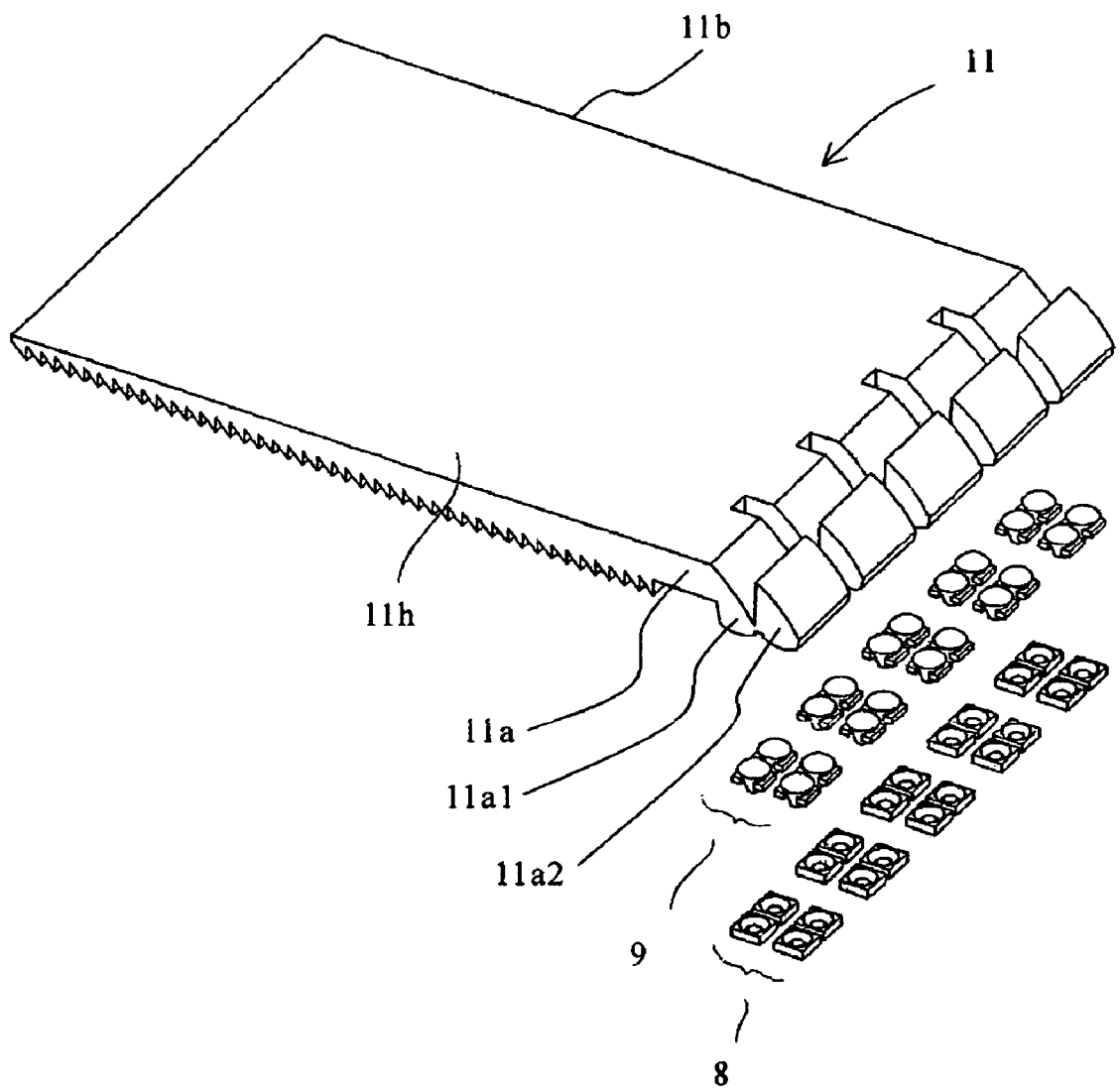
FIG. 10 is an exploded perspective view showing a light-emitting device which is another modification of Embodiment 2.

FIGS. 8 to 10 show a light-emitting device which is Embodiment 2 of the present invention. In Embodiment 2, components identical to those in Embodiment 1 are designated with the same reference numerals and description thereof is omitted. Embodiment 1 has been described in conjunction with the case where the optical member has the ring-shaped emergence surface. In Embodiment 2, an optical member has a plane emergence surface to change a luminous flux from an LED as a point source of light into a luminous flux which looks as if it is emitted from a surface light source. The light-emitting device of Embodiment 2 can be used for various purposes such as illumination for image-taking, backlight of a liquid crystal display, and a display by blinking or lighting in an electronic device such as a cellular phone.

Since light ray tracing diagrams of luminous fluxes emitted from LEDs are similar to those in Embodiment 1, they are omitted in Embodiment 2.

FIG. 8 shows an example where an optical member 10 has a light guiding portion 10a and an emergence portion 10b including a plane emergence surface 10h, five LEDs 8 are provided for each of first and second entrance portions 10a1 and 10a2 such that the luminous fluxes emitted from the five LEDs 8 are received by the associated entrance portions, and five condenser lenses 9 are provided for each of the first and second entrance portions 10a1 and 10a2.

FIG. 9 shows an example where an optical member 11 has a light guiding portion 11a and an emergence portion 11b including a plane emergence surface 11h, the light guiding portion 11a including first and second entrance portions 11a1 and 11a2 are divided into five, and an LED 8 and a condenser lens 9 are provided for each of the entrance portions such that the luminous flux emitted from the LED 8 is received by the associated entrance portion.

FIG. 10 shows an example where two LEDs 8 and two condenser lenses 9 are provided for each of first and second entrance portions 11a1 and 11a2 of an optical member 11 similar to that in FIG. 9.

Conventionally, in the typical illumination optical system with a light source called a surface light source, the surface of an optical member opposite to the emergence surface is formed as a diffusing surface realized by a white color dot print pattern or the like. A necessary amount of luminous flux is diffused by the diffusing surface and emerges from the optical member, and then is reflected by a reflecting plate, returned to the optical member, and caused to emerge from the emergence surface. The luminous flux is diffused by the diffusing surface to perform the direction change in this manner, resulting in significant loss of light amount.

In contrast, in Embodiment 2, since the direction of the luminous flux is changed by the total reflection in the emergence portion, the luminous flux from the light source can emerge toward an object efficiently without causing significant loss of light amount. Specifically, of the luminous flux entering the emergence portion, only the luminous flux component satisfying the condition is totally reflected and emerges from the emergence surface, while the luminous flux component not satisfying the condition is subjected to the refraction effect and again used effectively, so that the loss rate of the given light energy can be extremely reduced.

The number of the LEDs is not limited to the abovementioned ones, and an arbitrary number of LEDs can be set to achieve required luminance.

Embodiment 3

Figure 11:
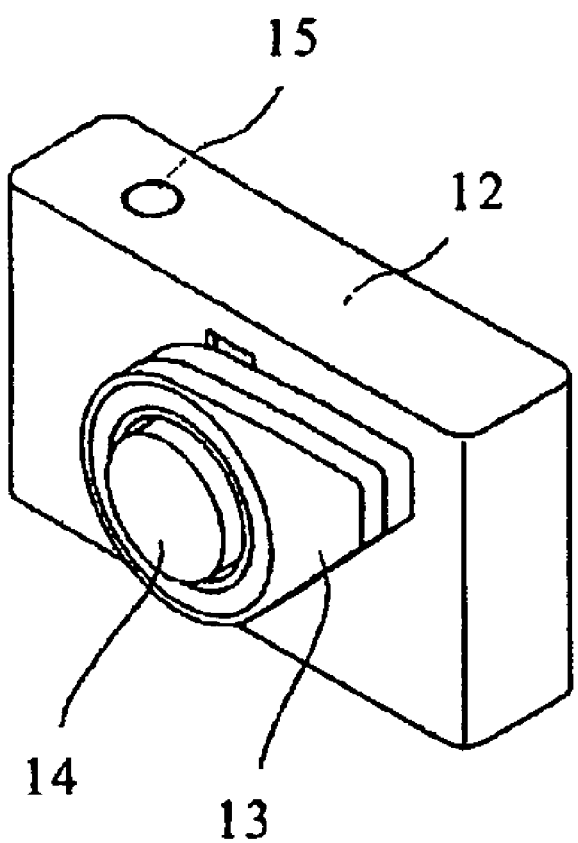
FIG. 11 is a perspective view showing a camera on which a light-emitting device serving as Embodiment 3 of the present invention is mounted.
Figure 12:
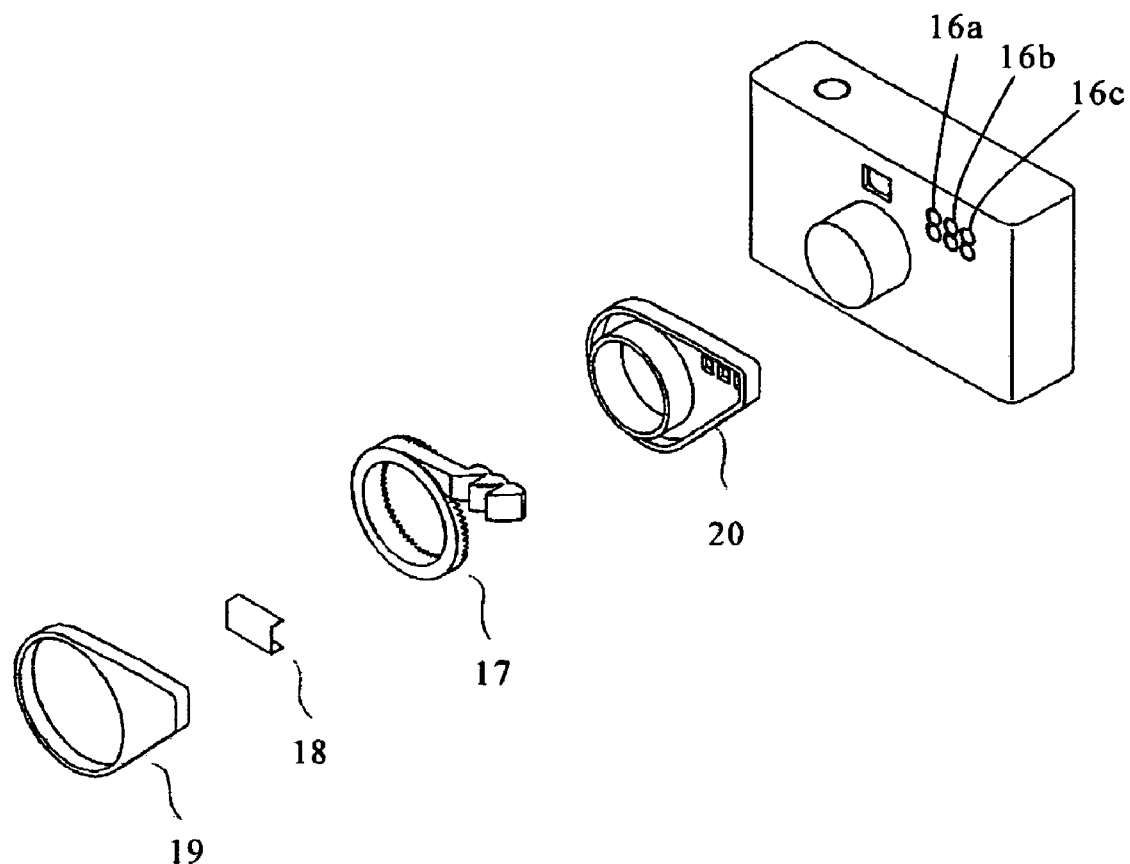
FIG. 12 is an exploded perspective view showing the light-emitting device of Embodiment 3.
Figure 13:
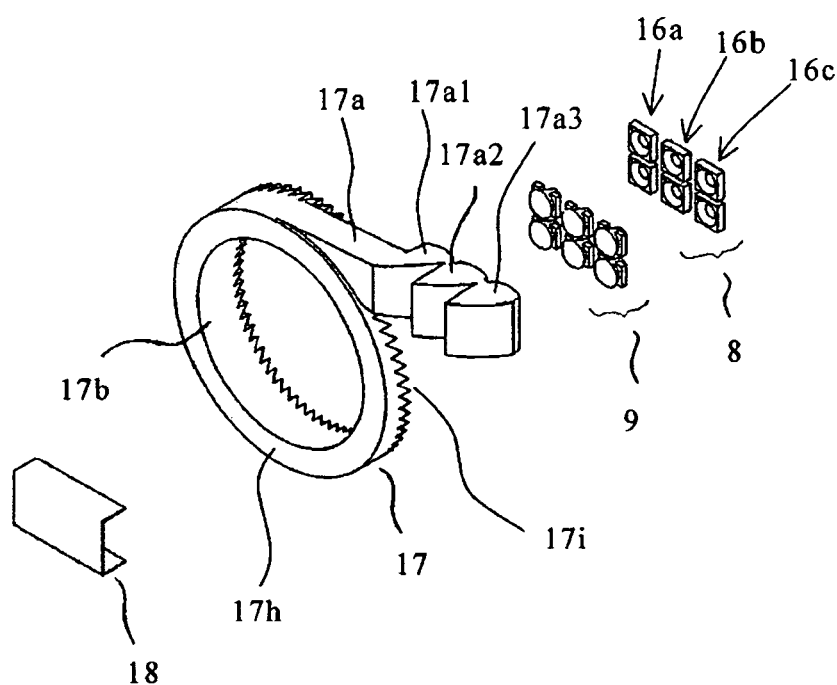
FIG. 13 is an exploded perspective view showing an optical system of the light-emitting device of Embodiment 3.

FIG. 11 shows an electronic camera (digital still camera or video camera) serving as an image-taking apparatus on which a ring light for macro photography which is Embodiment 3 of the present invention is mounted. FIG. 12 is an exploded view showing the ring light for macro photography mounted on the electronic camera. FIG. 13 shows the principal structure of an optical system of the ring light for macro photography mounted on the electronic camera. In Embodiment 3, components identical to those in Embodiment 1 are designated with the same reference numerals and description thereof is omitted. While Embodiment 1 has been described in conjunction with the two entrance portions provided for the optical member, three entrance portions are provided for an optical member in Embodiment 3. This allows a larger amount of luminous flux from an LED to emerge toward an object.

In FIGS. 11 and 12, reference numeral 12 shows the electronic camera. Reference numeral 13 shows the ring light for macro photography which is used to illuminate an object in macro photography, similarly to Embodiment 1. The ring light 13 for macro photography is removably mounted on the electronic camera 12. Reference numeral 14 shows a lens barrel which has an image-taking lens and forms an image of an object on an image-pickup device, not shown. Reference numeral 15 shows a release button.

Reference numerals 16a to 16c show first to third light emitters which emit light when object luminance is low or special image-taking is performed. Embodiment 3 includes more light emitters than in Embodiment 1 to provide a higher luminance. Reference numeral 17 shows the optical member which has a light guiding portion 17a for directing light from the first to third light emitters 16a to 16c to an emergence portion 17b, later described, and the emergence portion in ring shape (hereinafter referred to as the ring portion) 17b for applying the luminous flux guided thereto by the light guiding portion 17a toward the object. The optical member 17 is made of a light-transmissive resin material.

The ring-shaped emergence portion 17b of the optical member 17 is disposed around the end of the lens barrel 15 such that its center substantially matches the center of the optical axis of the lens barrel 15.

Reference numeral 18 shows a reflecting plate which is disposed to cover the entrance portions of the optical member 17 on the object side. The reflecting plate 18 has an inner surface made of a metal material such as bright aluminum having a high reflectivity. Reference numeral 19 shows a front cover which houses the optical member 17, and 20 a rear cover which houses the optical member 17.

As shown in FIG. 13, each of the light emitters 16a to 16c has two LEDs 8 which emit white light and two condenser lenses 9 for condensing the luminous fluxes emitted from the LEDs 8. The LED emits light in response to power supplied by an electric circuit, not shown. The condenser lens 9 gathers the luminous flux emitted from the associated LED 8 to an arbitrary irradiation range. The condenser lens 9 is made of a highly transparent resin material. The LEDs 8 and the condenser lenses 9 are contained in the electronic camera 12.

The light guiding portion 17a of the optical member 17 includes a first entrance portion 17a1, a second entrance portion 17a2, and a third entrance portion 17a3 associated with the first to third light emitters 16a1 to 16a3, respectively, to change the directions of the luminous fluxes condensed by the condenser lenses 9 and gather the luminous fluxes to narrow ranges. The luminous fluxes enter the optical member 17 from the first to third entrance portions 17a1 to 17a3, travel in the light guiding portion 17a, and then are guided to the ring portion 17b.

The ring portion 17b has a ring emergence surface 17h for applying the luminous fluxes toward the object and light direction converting surfaces 17i on the side opposite to the ring emergence surface 17h. While the luminous fluxes directed into the ring portion 17b then travel in the ring portion 17b, their directions are changed by the abovementioned light direction converting surfaces 17i or the like, until they are guided to the ring emergence surface 17h and emerge therefrom.

Figure 14:
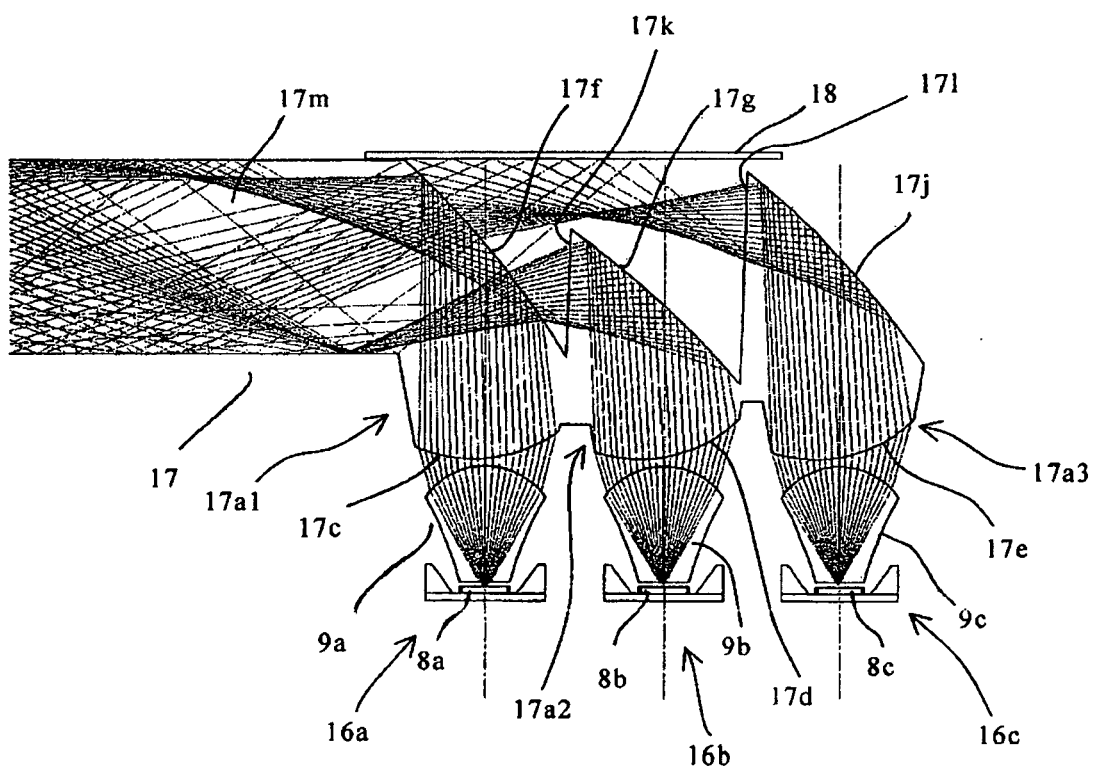
FIG. 14 is enlarged sectional view showing entrance portions and the surroundings in the optical system of the light-emitting device of Embodiment 3.

FIG. 14 is an enlarged sectional view of main portions forming the optical system of the ring light for macro photography of Embodiment 3 to show the entrance portions of the optical member 17 and the surroundings. FIG. 14 also shows a light ray tracing diagram.

As shown in FIG. 14, the first entrance portion 17a1 has an entrance surface 17c having a positive optical power which is opposed to the first light emitter 16a and receives the luminous flux from the first light emitter 16a, and a total reflecting surface 17f having a positive optical power which substantially totally reflects the luminous flux transmitted through the entrance surface 17c. The second and third entrance portions 17a2 and 17a3 have entrance surfaces 17d and 17e having positive optical powers which are opposed to the second and third light emitters 16b and 16c and receive the luminous fluxes from the second and third light emitters 16b and 16c, total reflecting surfaces 17g and 17j having positive optical powers which substantially totally reflect the luminous fluxes transmitted through the entrance surfaces 17d and 17e, and emergence surfaces 17k and 17l which send the luminous fluxes totally reflected by the total reflecting surfaces 17g and 17j outside the optical member 17, respectively. Each of the total reflecting surfaces 17f, 17g, and 17j is formed of a continuous aspheric surface. The first to third entrance portions 17a1 to 17a3 are connected to each other through their portions closer to the entrance surfaces.

Reference numeral 17m shows a connection portion which links the first to third entrance portions 17a1 to 17a3 of the light guiding portion 17a to the ring portion 17b.

The luminous fluxes emitted from the LEDs 8a to 8c of the first to third light emitters 16a to 16c are then condensed by the condenser lenses 9a to 9c, respectively, to the predetermined irradiation angle range. The irradiation angle range corresponds to an irradiation angle range necessary for a typical camera-to-object distance (for example, 50 cm or longer) in the electronic camera. The irradiation angle range is adjusted by the shapes of the condenser lenses 9a to 9c and the distances between the LEDs 8a to 8c and the condenser lenses 9a to 9c. The luminous fluxes emerging from the condenser lenses 9a to 9c then enter the first to third entrance portions 17a1 to 17a3 from the entrance surfaces 17c, 17d, and 17e, respectively. The entrance surfaces 17c, 17d, and 17e are larger than the emergence surfaces of the condenser lenses 9a to 9c and thus can make the most of the light amounts emerging from the condenser lenses 9a to 9c, that is, the light amounts emitted from the LEDs 8a to 8c.

The luminous fluxes are condensed by the entrance surfaces 17c, 17d, and 17e, and the total reflecting surfaces 17f, 17g, and 17j, while the directions thereof are changed by the total reflecting surfaces 17f, 17g, and 17j. Specifically, the total reflecting surfaces 17f, 17g, and 17j change the directions by approximately π/2 (rad) to allow efficient guidance of the luminous fluxes from the entrance surfaces 17c, 17d, and 17e to the ring portion 17b.

The first to third entrance portions 17a1 to 17a3 perform the abovementioned direction changes by using the total reflecting surfaces similarly to Embodiment 1, not by using a metal-evaporated surface with high reflectivity which is often used as a reflecting surface.

The luminous fluxes in the directions changed by the total reflecting surfaces 17f, 17g, and 17j in the first to third entrance portions 17a1 to 17a3 are guided to the connection portion 17m. The luminous flux reflected by the total reflecting surface 17g of the second entrance portion 17a2 once emerges outside the optical member 17 from the emergence surface 17k, and again enters the optical member 17 from the total reflecting surface 17f of the first entrance portion 17a1. The luminous flux reflected by the total reflecting surface 17j of the third entrance portion 17a3 once emerges from the optical member 17 from the emergence surface 17l and again enters the optical member 17 from the total reflecting surface 17f of the first entrance portion 17a1. Of the luminous flux emerging outside the optical member 17 from the emergence surface 17l, the component traveling in the direction away from the total reflecting surface 17f of the first entrance portion 17a1 is reflected by the reflecting member 18 which is disposed to cover part of the entrance portions from the outer side (closer to the object) of the total reflecting surface 17f to the outer side of the emergence surface 17l of the third entrance portion 17a3. This guides that component toward the total reflecting surface 17f.

Since the total reflecting surface 17f is realized by the total reflection, not by a metal-evaporated surface, it allows the re-entrance of the luminous fluxes into the optical member 17 after they are reflected by the total reflecting surface 17g and 17j and emerge from the emergence surfaces 17k and 17l. Each of the total reflecting surfaces 17g and 17j may be formed as a reflecting surface realized by a metal-evaporated surface.

The first entrance portion 17a1 is connected to the ring portion 17b through the connection portion 17m. The luminous flux entering the ring portion 17b through the connection portion 17m is then reflected a number of times within the ring portion 17b, and part of the luminous flux emerges from the ring emergence surface 17h. The shape of the connection portion 17m is set to minimize the luminous flux entering the ring portion 17b and then returning toward the entrance portions 17a1 to 17a3 through the connection portion 17m.

In Embodiment 3, similarly to Embodiment 1, a number of the direction converting surfaces 17i are formed on the surface of the ring portion 17b opposite to the emergence surface (the ring emergence portion) 17h to reflect the luminous fluxes incident on the direction converting surfaces 17i toward the object. This allows emergence of a generally uniform light amount from substantially the entire ring emergence surface 17h.

It is possible that luminous fluxes emitted from three or more LEDs enter the single entrance portion.

Embodiment 4

Figure 15:
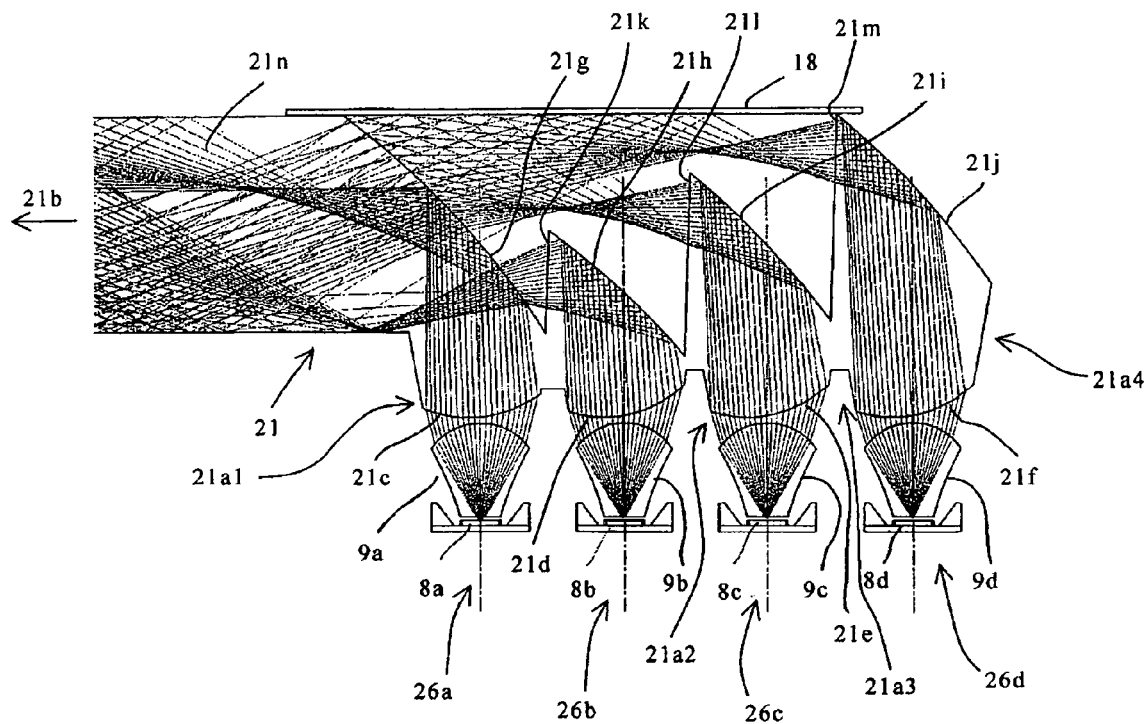
FIG. 15 is enlarged sectional view showing entrance portions and the surroundings in an optical system of a light-emitting device which is Embodiment 4 of the present invention.

FIG. 15 is an enlarged view of entrance portions and the surroundings in a ring light for macro photography which is Embodiment 4 of the present invention, and also shows a light ray tracing diagram. In Embodiment 4, components identical to those in Embodiment 1 are designated with the same reference numerals, and description thereof is omitted. While Embodiments 1 and 3 have been described in conjunction with the two or three entrance portions provided for the optical member, four entrance portions are provided for an optical member in Embodiment 4. This allows a larger amount of luminous flux from an LED to emerge toward an object.

An optical member 21 shown in FIG. 15 has a light guiding portion and a ring portion similarly to Embodiment 1, although not shown. The light guiding portion includes first to fourth entrance portions 21a1 to 21a4.

The first entrance portion 21a1 includes an entrance surface 21c having a positive optical power which is opposed to a first light emitter 26a and receives a luminous flux from the first light emitter 26a and a total reflecting surface 21g having a positive optical power which substantially totally reflects the luminous flux transmitted through the entrance surface 21c.

The second to fourth entrance portions 21a2 to 21a4 have entrance surfaces 21d, 21e, and 21f having positive optical powers which are opposed to second to fourth light emitters 26b to 26d and receive luminous fluxes from the second to fourth light emitters 26b to 26d, total reflecting surfaces 21h, 21i, and 21j having positive optical powers which substantially totally reflect the luminous fluxes transmitted through the entrance surfaces 21d to 21f, and emergence surfaces 21k, 21l, and 21m which send the luminous fluxes totally reflected by the total reflecting surfaces 21h to 21j outside the optical member 17, respectively. Each of the total reflecting surfaces 21g to 21j is formed of a continuous aspheric surface. The first to fourth entrance portions 21a1 to 21a4 are connected to each other through their portions closer to the entrance surfaces.

Reference numeral 21n shows a connection portion which links the first to fourth entrance portions 21a1 to 21a4 of the light guiding portion to the ring portion.

The luminous fluxes emitted from LEDs 8a to 8d of the first to fourth light emitters 26a to 26d are then condensed by condenser lenses 9a to 9d, respectively, to a predetermined irradiation angle range. The irradiation angle range corresponds to an irradiation angle range necessary for a typical camera-to-object distance (for example, 50 cm or longer) in an electronic camera. The irradiation angle range is adjusted by the shapes of the condenser lenses 9a to 9d and the distances between the LEDs 8a to 8d and the condenser lenses 9a to 9d. The luminous fluxes emerging from the condenser lenses 9a to 9d then enter the first to fourth entrance portions 21a1 to 21a4 from the entrance surfaces 21c to 21f, respectively. The entrance surfaces 21c to 21f are larger than the emergence surfaces of the condenser lenses 9a to 9d and thus can make the most of the light amounts emerging from the condenser lenses 9a to 9d, that is, the light amounts emitted from the LEDs 8a to 8d.

The luminous fluxes are condensed by the entrance surfaces 21c to 21f and the total reflecting surfaces 21g to 21j, while the directions thereof are changed by the total reflecting surfaces 21g to 21j. Specifically, the total reflecting surfaces 21g to 21j change the directions by approximately π/2 (rad) to allow efficient guidance of the luminous fluxes from the entrance surfaces 21c to 21f to the ring portion.

The first to fourth entrance portions 21a1 to 21a4 perform the abovementioned direction changes by using the total reflecting surfaces similarly to Embodiment 1, not by using a metal-evaporated surface with high reflectivity which is often used as a reflecting surface.

The luminous fluxes in the directions changed by the total reflecting surfaces 21g to 21j in the first to fourth entrance portions 21a1 to 21a4 are guided to the connection portion 21n. The luminous flux reflected by the total reflecting surface 21h of the second entrance portion 21a2 once emerges outside the optical member 21 from the emergence surface 21k, and again enters the optical member 21 from the total reflecting surface 21g of the first entrance portion 21a1. The luminous flux reflected by the total reflecting surface 21i of the third entrance portion 21a3 once emerges outside the optical member 21 from the emergence surface 21l, and again enters the optical member 21 from the total reflecting surface 21g of the first entrance portion 21a1. The luminous flux reflected by the total reflecting surface 21j of the fourth entrance portion 21a4 once emerges from the optical member 21 from the emergence surface 21m, and again enters the optical member 21 from the total reflecting surface 21g of the first entrance portion 21a1.

Of the luminous flux emerging outside the optical member 21 from the emergence surface 21m, the component traveling in the direction away from the total reflecting surface 21g of the first entrance portion 21a1 is reflected by a reflecting member 18 which is disposed to cover part of the entrance portions from the outer side (closer to the object) of the total reflecting surface 21g to the outer side of the emergence surface 21m of the fourth entrance portion 21a4. This guides that component toward the total reflecting surface 21g.

Since the total reflecting surface 21g is realized by the total reflection, not by a metal-evaporated surface, it allows the re-entrance of the luminous fluxes into the optical member 21 after they are reflected by the total reflecting surfaces 21h to 21j and emerge from the emergence surfaces 21k to 21m. Each of the total reflecting surfaces 21h to 21j may be formed as a reflecting surface realized by a metal-evaporated surface.

The first entrance portion 21a1 is connected to the ring portion through the connection portion 21n. The luminous flux entering the ring portion through the connection portion 21n is then reflected a number of times within the ring portion, and part of the luminous flux emerges from a ring emergence surface, similarly to Embodiment 1. The shape of the connection portion 21n is set to minimize the luminous flux entering the ring portion and then returning toward the entrance portions 21a1 to 21a4 through the connection portion 21n.

In Embodiment 4, similarly to Embodiment 1, a number of direction converting surfaces are formed on the surface of the ring portion opposite to the emergence surface (ring emergence surface) to reflect the luminous flux incident on the direction converting surfaces toward the object. This allows emergence of a generally uniform light amount from substantially the entire ring emergence surface.

It is possible that luminous fluxes emitted from three or more LEDs enter the single entrance portion. In addition, fiver or more entrance portions may be formed in the optical member.

Embodiment 5

Figure 16:
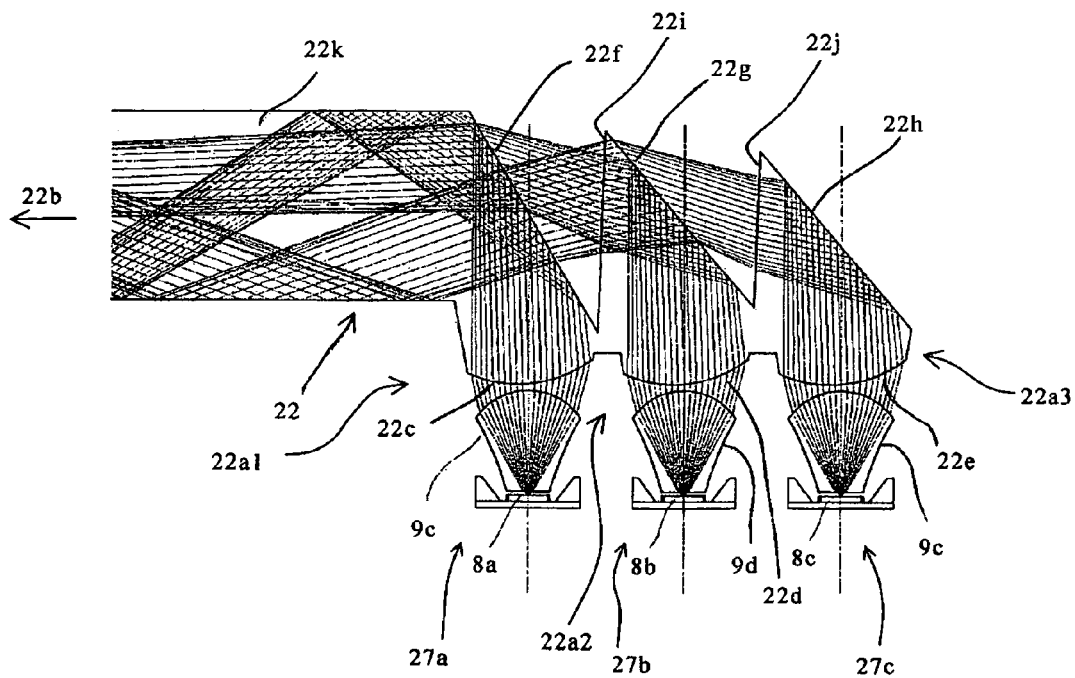
FIG. 16 is enlarged sectional view showing entrance portions and the surroundings in an optical system of a light-emitting device which is Embodiment 5 of the present invention.

FIG. 16 is an enlarged view of entrance portions and the surroundings in a ring light for macro photography which is Embodiment 5 of the present invention, and also shows a light ray tracing diagram. In Embodiment 5, components identical to those in Embodiment 1 are designated with the same reference numerals, and description thereof is omitted. Embodiment 3 has been described in conjunction with the three entrance portions provided for the optical member and the reflecting member formed outside the entrance portions. Embodiment 5 shows an example in which three entrance portions are formed but no reflecting member is provided. This can reduce the cost as compared with Embodiment 3.

An optical member 22 shown in FIG. 16 has a light guiding portion and a ring portion similarly to Embodiment 3, although not shown. The light guiding portion includes first to three entrance portions 22a1 to 22a3.

The first entrance portion 22a1 includes an entrance surface 22c having a positive optical power which is opposed to a first light emitter 27a and receives a luminous flux from the first light emitter 27a and a total reflecting surface 22f having a positive optical power which substantially totally reflects the luminous flux transmitted through the entrance surface 22c. The second and third entrance portions 22a2 and 22a3 have entrance surfaces 22d and 22e having positive optical powers which are opposed to second and third light emitters 27b and 27c and receive luminous fluxes from the second and third light emitters 27b and 27c, total reflecting surfaces 22g and 22h having positive optical powers which substantially totally reflect the luminous fluxes transmitted through the entrance surfaces 22d and 22e, and emergence surfaces 22i and 22j which send the luminous fluxes totally reflected by the total reflecting surfaces 22g and 22h outside the optical member 22. Each of the total reflecting surfaces 22f, 22g, and 22h is formed of a continuous aspheric surface. The first to third entrance portions 22a1 to 22a3 are connected to each other through their portions closer to the entrance surfaces.

Reference numeral 22k shows a connection portion which links the first to third entrance portions 22a1 to 22a3 of the light guiding portion to the ring portion.

The luminous fluxes emitted from LEDs 8a to 8c of the first to third light emitters 27a to 27c are then condensed by condenser lenses 9a to 9c, respectively, to a predetermined irradiation angle range. The irradiation angle range corresponds to an irradiation angle range necessary for a typical camera-to-object distance (for example, 50 cm or longer) in an electronic camera. The irradiation angle range is adjusted by the shapes of the condenser lenses 9a to 9c and the distances between the LEDs 8a to 8c and the condenser lenses 9a to 9c. The luminous fluxes emerging from the condenser lenses 9a to 9c then enter the first and third entrance portions 22a1 to 22a3 from the entrance surfaces 22c, 22d, and 22e, respectively. The entrance surfaces 22c, 22d, and 22e are larger than the emergence surfaces of the condenser lenses 9a to 9c and thus can make the most of the light amounts emerging from the condenser lenses 9a to 9c, that is, the light amounts emitted from the LEDs 8a to 8c.

The luminous fluxes are condensed by the entrance surfaces 22c, 22d, and 22e, and the total reflecting surfaces 22f, 22g, and 22h, while the directions thereof are changed by the total reflecting surfaces 22f, 22g, and 22h. Specifically, the total reflecting surfaces 22f, 22g, and 22h change the directions by approximately $\pi/2$ (rad) to allow efficient guidance of the luminous fluxes from the entrance surfaces 22c, 22d, and 22e to the ring portion.

The first to third entrance portions 22a1 to 22a3 perform the abovementioned direction changes by using the total reflecting surfaces similarly to Embodiment 3, not by using a metal-evaporated surface with high reflectivity which is often used as a reflecting surface.

The luminous fluxes in the directions changed by the total reflecting surfaces 22f, 22g, and 22h in the first to third entrance portions 22a1 to 22a3 are guided to the connection portion 22k. The luminous flux reflected by the total reflecting surface 22g of the second entrance portion 22a2 once emerges outside the optical member 22 from the emergence surface 22i, and again enters the optical member 22 from the total reflecting surface 22f of the first entrance portion 22a1.

The luminous flux reflected by the total reflecting surface 22h of the third entrance portion 22a3 once emerges from the optical member 22 from the emergence surface 22j, and again enters the optical member 22 from the total reflecting surface 22g of the second entrance portion 22a2, and then emerges outside the optical member 22 from the emergence surface 22i of the second entrance portion 22a2. Then, it again enters the optical member 22 from the total reflecting surface 22f of the first entrance portion 22a1.

The total reflecting surfaces 22f and 22g are realized as reflecting surfaces by using the total reflection, not as reflecting surfaces by using metal-evaporated surfaces, so that they allow the re-entrance of the luminous flux into the optical member 22 after it is reflected by the total reflecting surface 22h and emerges from the emergence surface 22j. The total reflecting surface 22h may be formed as a reflecting surface realized by a metal-evaporated surface.

The first entrance portion 22a1 is connected to the ring portion through the connection portion 22k. The luminous flux entering the ring portion through the connection portion 22k is then reflected a number of times within the ring portion, and part of the luminous flux emerges from a ring emergence surface, similarly to Embodiment 3. The shape of the connection portion 22k is set to minimize the luminous flux entering the ring portion and then returning toward the entrance portions 22a1 to 22a3 through the connection portion 22k.

In Embodiment 5, similarly to Embodiment 3, a number of direction converting surfaces are formed on the surface of the ring portion opposite to the emergence surface (ring emergence surface) to reflect the luminous flux incident on the direction converting surfaces toward the object. This allows emergence of a generally uniform light amount from substantially the entire ring emergence surface.

It is possible that luminous fluxes emitted from three or more LEDs enter the single entrance portion.

As described above, according to each of Embodiments 1 to 5 described above, the small structure makes it possible that the luminous fluxes entering the light guiding portion (entrance portions) from the plurality of LEDs can be guided efficiently toward the emergence portion and then applied to the object from the emergence portion as illumination light with uniform and predetermined angle distribution. Thus, the light-emitting device can be realized with a small size and low cost as illumination optimal for macro photography and the like.

In other words, according to each of Embodiments 1 to 5, the luminous fluxes from the plurality of light sources can be changed efficiently to have the predetermined light emission characteristic through the optical effects of the refracting surfaces and the reflecting surfaces formed on the optical member to achieve emergence from the common emergence surface. In addition, the light emitted from the second light source and reflected by the second reflecting surface is then transmitted through the first reflecting surface, which reflects the light from the first light source, to guide the light toward the emergence surface, so that the light-emitting device can be reduced in size.

The ring-shaped emergence surface is disposed around the lens barrel, to which the luminous fluxes from the LEDs serving as the light sources are directed, thereby reducing the influence of the parallax between the illumination areas of the LEDs and the image-taking area of the image-taking lens.

In each of Embodiments 1 to 5, a light amount control circuit may be provided for variably controlling the amount of light emitted from an LED. For example, display for indicating self-timer image-taking or light emission for minimizing red-eye does not require a light amount from an LED large enough to illuminate an object brightly, so that the light amount control circuit may be provided to reduce unnecessary power consumption. It is also possible to change the amount of light emitted from an LED or the number of LEDs to emit light in accordance with the brightness of an object or the distance to the object based on the photometric results or distance measurement information prior to image-taking.

While each of Embodiments 1 to 5 has been described in conjunction with the white LED used as the light source, other light sources may be used. For example, when the light-emitting device of Embodiment 2 is used as a display device for achieving display by blinking or illumination of light other than the white light, a light source other than the white LED may be used.

Each of Embodiments 1 to 5 has been described in conjunction with the light-emitting device which realizes illumination with the predetermined light distribution characteristic by using the light source provided for the camera-equipped cellular phone or camera. However, the present invention is applicable to the case where a light source is included in the light-emitting device. In addition, the light-emitting device of the present invention can be mounted on or contained in various apparatus, not limited to the camera-equipped cellular phone or camera.

The present invention is not limited to Embodiments 1 to 5 described above and is practiced in various modes without departing from the spirit or scope of the present invention. Each of Embodiments 1 to 5 may be carried out with modification as appropriate. In other words, the present invention is not limited to the dimensions, materials, shapes, arrangements and the like of the components described in Embodiments 1 to 5.

This application claims a foreign priority benefit based on Japanese Patent Applications No. 2005-075819, filed on Mar. 16, 2005, which is hereby incorporated by reference herein in its entirety as if fully set forth herein.

What is claimed is:

1. A light-emitting device comprising:
an optical member which includes a first reflecting surface which reflects light incident thereon from a first LED light source, a second reflecting surface which reflects light incident thereon from a second LED light source that is placed adjacent to the first LED light source, and an emergence portion which causes the light from the first reflecting surface and the light from the second reflecting surface to emerge therefrom,
wherein the first and second reflecting surfaces receives the light coming from the same direction from the first and second LED light sources, and
the optical member reflects the light by the second reflecting surface and then transmits the reflected light through the first reflecting surface to cause the reflected light to enter the optical member for guiding the reflected light to the emergence portion.

2. The light-emitting device according to claim 1, wherein the optical member includes a third reflecting surface which reflects light incident thereon from a third LED light source that is placed adjacent to the second LED light source, and
the optical member reflects the light by the second reflecting surface and then transmits the reflected light through the first reflecting surface to cause the reflected light to enter the optical member for guiding the reflected light to the emergence portion, and
the optical member reflects the light by the third reflecting surface and then transmits the reflected light through the first reflecting surface to cause the reflected light to enter the optical member for guiding the reflected light to the emergence portion without passing the reflected light through the second reflecting surface.

3. The light-emitting device according to claim 1, wherein the optical member includes a third reflecting surface which reflects light incident thereon from a third LED light source that is placed adjacent to the second LED light source, and
the optical member reflects the light by the second reflecting surface and then transmits the reflected light through the first reflecting surface to cause the reflected light to enter the optical member for guiding the reflected light to the emergence portion, and
the optical member reflects the light by the third reflecting surface and then transmits the reflected light through the first and second reflecting surfaces to cause the reflected light to enter the optical member for guiding the reflected light to the emergence portion.

4. The light-emitting device according to claim 1, further comprising a reflecting member which reflects the light after the reflection by the reflecting surface other than the first reflecting surface toward the first reflecting surface.

5. The light-emitting device according to claim 1, wherein the emergence portion includes a plurality of reflecting surfaces which reflect and guide the light from the first reflecting surface to an emergence surface of the emergence portion.

6. The light-emitting device according to claim 1, wherein the emergence portion is formed in ring shape.

7. An apparatus including a light-emitting device, comprising:

the light-emitting device according to claim 1, wherein the light-emitting device is removably mounted on or integrally formed with the apparatus.

* * * * *

UNITED STATES PATENT AND TRADEMARK OFFICE
CERTIFICATE OF CORRECTION

PATENT NO. : 7,224,501 B2  
APPLICATION NO. : 11/374536  
DATED : May 29, 2007  
INVENTOR(S) : Nobuhisa Kojima Page 1 of 1

It is certified that error appears in the above-identified patent and that said Letters Patent is hereby corrected as shown below:

On Title page, Item (75) Inventor:, delete "Kojima, Yokohama" and insert --Kojima, Kanagawa-ken--

Signed and Sealed this

Twenty Second Day of April, 2008

JON W. DUDAS  
*Director of the United States Patent and Trademark Office*